United States Patent
Dines et al.

(10) Patent No.: US 9,318,103 B2
(45) Date of Patent: Apr. 19, 2016

(54) SYSTEM AND METHOD FOR RECOGNIZING A USER VOICE COMMAND IN NOISY ENVIRONMENT

(71) Applicant: VEOVOX SA, Pully (CH)

(72) Inventors: John Dines, Lausanne (CH); Jorge Carmona, Pully (CH); Olivier Masson, Vevey (CH); Guillermo Aradilla, Neu-Ulm (DE)

(73) Assignee: VEOVOX SA, Pully (CH)

( * ) Notice: Subject to any disclaimer, the term of this patent is extended or adjusted under 35 U.S.C. 154(b) by 0 days.

(21) Appl. No.: 13/773,190

(22) Filed: Feb. 21, 2013

(65) Prior Publication Data

US 2013/0166279 A1 Jun. 27, 2013

Related U.S. Application Data

(63) Continuation of application No. PCT/EP2011/064588, filed on Aug. 24, 2011.

(30) Foreign Application Priority Data

Aug. 24, 2010 (CH) ........................ 1354/10

(51) Int. Cl.
*G10L 15/02* (2006.01)
*G10L 17/02* (2013.01)
*G10L 15/06* (2013.01)
*G10L 15/12* (2006.01)
(Continued)

(52) U.S. Cl.
CPC .............. *G10L 15/02* (2013.01); *G10L 15/063* (2013.01); *G10L 17/02* (2013.01); *G10L 15/12* (2013.01); *G10L 15/16* (2013.01); *G10L 15/20* (2013.01)

(58) Field of Classification Search
USPC ............. 704/8, 245, 275, 253, 270, 231, 207, 704/239, 251, 241; 379/88.01, 88.02
See application file for complete search history.

(56) References Cited

U.S. PATENT DOCUMENTS

| | | | | |
|---|---|---|---|---|
| 4,481,593 | A | * | 11/1984 | Bahler .......................... 704/253 |
| 4,860,358 | A | * | 8/1989 | Rabiner ................. G10L 15/00 704/241 |
| 4,994,983 | A | * | 2/1991 | Landell et al. ................ 704/245 |

(Continued)

OTHER PUBLICATIONS

Benitez, Carmen, Lukas Burget, Barry Chen, Stéphane Dupont, Hari Garudadri, Hynek Hermansky, Pratibha Jain, Sachin Kajarekar, Nelson Morgan, and Sunil Sivadas. "Robust ASR front-end using spectral-based and discriminant features: experiments on the Aurora tasks." In Proceedings of Eurospeech, pp. 429-432, 2001.*

(Continued)

*Primary Examiner* — Pierre-Louis Desir
*Assistant Examiner* — Neeraj Sharma
(74) *Attorney, Agent, or Firm* — Oliff PLC

(57) ABSTRACT

An automatic speech recognition system for recognizing a user voice command in noisy environment, including: matching means for matching elements retrieved from speech units forming said command with templates in a template library; characterized by processing means including a MultiLayer Perceptron for computing posterior templates $(P(O^{template(q)}))$ stored as said templates in said template library; means for retrieving posterior vectors $(P(O^{test(q)}))$ from said speech units, said posterior vectors being used as said elements. The present invention relates also to a method for recognizing a user voice command in noisy environments.

17 Claims, 4 Drawing Sheets

(51) Int. Cl.
*G10L 15/16* (2006.01)
*G10L 15/20* (2006.01)

(56) References Cited

U.S. PATENT DOCUMENTS

| | | | |
|---|---|---|---|
| 6,985,865 B1* | 1/2006 | Packingham et al. | 704/275 |
| 2001/0010039 A1* | 7/2001 | Yang | 704/239 |
| 2002/0003867 A1* | 1/2002 | Rothschild et al. | 379/88.01 |
| 2002/0040296 A1* | 4/2002 | Kienappel | G10L 15/02 704/220 |
| 2002/0165715 A1* | 11/2002 | Riis | G10L 15/08 704/254 |
| 2004/0158462 A1* | 8/2004 | Rutledge et al. | 704/207 |
| 2004/0193408 A1* | 9/2004 | Hunt | G10L 15/08 704/209 |
| 2005/0049872 A1* | 3/2005 | Dharanipragada | G10L 15/02 704/256 |
| 2005/0246172 A1* | 11/2005 | Huang | G10L 15/063 704/243 |
| 2006/0058996 A1* | 3/2006 | Barker | G09B 5/04 704/231 |
| 2007/0033043 A1* | 2/2007 | Hyakumoto | G10L 15/1815 704/255 |
| 2007/0192101 A1* | 8/2007 | Braho et al. | 704/251 |
| 2007/0288242 A1* | 12/2007 | Spengler | G10L 15/20 704/275 |
| 2008/0208577 A1* | 8/2008 | Jeong et al. | 704/231 |
| 2008/0215322 A1* | 9/2008 | Fischer | G10L 15/063 704/243 |
| 2009/0006087 A1* | 1/2009 | Imoto | G10L 15/26 704/231 |
| 2009/0099847 A1* | 4/2009 | Soong et al. | 704/270 |
| 2010/0076759 A1* | 3/2010 | Shinohara | G10L 15/20 704/233 |
| 2010/0106501 A1* | 4/2010 | Miki | G10L 17/04 704/243 |
| 2010/0150321 A1* | 6/2010 | Harris et al. | 379/88.02 |
| 2010/0179812 A1* | 7/2010 | Jang | G10L 15/065 704/244 |

OTHER PUBLICATIONS

Aradilla et al., "An Acoustic Model Based on Kullback-Leibler Divergence for Posterior Features," *IDIAP Resarch Report*, Jan. 2007, pp. 1-8, vol. 6, No. 60, IDIAP Research Institute, CH.

Aradilla et al., "Posterior Features Applied to Speech Recognition Tasks with User-Defined Vocabulary," *IEEE International Conference on Acoustics, Speech and Signal Processing*, 2009, pp. 3809-3812, New Jersey, US.

Watanuki et al., "Template Selection Method for Speaker-Independent Word Recognition," *IP.com Journal*, 1986, pp. 1-2, IP.com Inc., New York, US.

Yalabik et al., "Modified Condensed Nearest Neighbor Rule as Applied to Speaker Independent Word Recognition," *Speech Communication*, 1988, pp. 411-415, vol. 7, No. 4, Elsevier Science Publishers B.V., NL.

Sanchez et al., "Prototype selection for the nearest neighbour rule through proximity graphs," *Pattern Recognition Letters*, 1997, pp. 507-513, vol. 18, No. 6, Elsevier Science B.V., NL.

International Search Report issued in International Application No. PCT/EP2011/064588 dated Oct. 21, 2011.

* cited by examiner

PRIOR ART

SYSTEM AND METHOD FOR RECOGNIZING A USER VOICE COMMAND IN NOISY ENVIRONMENT

The present application is a continuation of international application PCT/EP2011/064588 filed on Aug. 24, 2011, the contents of which is enclosed by reference. It claims priority from Swiss Patent Application CH2010/1354, filed on Aug. 24, 2010, the contents of which is enclosed by reference.

FIELD OF THE INVENTION

The present invention concerns a method and a system for entering and recognizing user voice commands in noisy environments.

DESCRIPTION OF RELATED ART

Automatic Speech Recognition (ASR) systems are known for recognizing spoken words in audio signals.

ASR is used for example in call centres. When a user needs some information, for example the time departure of a train from a given train station, he can ask orally the desired information to a call centre by using a phone or a mobile phone. The user speaks and asks information and a system recognizes the spoken words for retrieving data. Another example of ASR is an automatic telephone directory. A user can call a number and ask orally the phone number of a person living in a city.

In these two examples, the voice of the user is recognized and converted into an electrical signal used by a system for retrieving the desired information. In both cases the communication channel between the user and the system is known. It can be a twisted pair in the case of a fixed phone or the operator's channel in the case of a mobile phone. Furthermore, the channel's noise can be modelled with known models.

Moreover, those applications typically imply a large number of possible words which can be used by a speaker. For example, the number of different possible train stations, the number of the cities in a country or the number of the names of people living in a given city is usually very large. However, the dictionary of words to recognize does not require a frequent update, because they do not change very often; each word in the dictionary usually remains unchanged in this dictionary for weeks, months or even years.

Apart from those known applications for which most ASR have been developed, other ASR are sometimes needed in noisy environments, such as (without limitations) in bars, restaurants, discotheques, hotels, hospitals, entertainment industry, groceries, etc. for taking, recognizing and transmitting voice-orders. For example, it would be useful to have an ASR in a bar or restaurant, with which a waiter taking orders from customers sitting at a table could repeat each order and speak them in a microphone of a mobile device. The voice signal received from an access point could then be converted into text commands by a speech recognition server which runs a speech recognition algorithm. The access point can belong to a local area network (LAN), to which various other equipments such as the server are connected.

In such environments, speech recognition is difficult because the signal to noise ratio can be insufficient. Moreover the noise of the environment is not known and it can change depending on people in the bar or restaurant. The possible words uttered by the speaker can be, for example, the words contained in the menu of the day. Then the number of words is often limited, for example to a few hundreds words maximum. Moreover these words can change each day—in the case of the menu of the day—or for example each week or twice a month. Therefore, the requirements for a speech recognition system in such an environment or for such an application are very different from the requirements on which most commercially available ASR systems are based.

It is therefore an aim of the present invention to develop a new ASR method and apparatus which are better adapted to those very specific and unusual requirements (poor signal/noise ratio, limited dictionary, rapidly changing dictionary, very high recognition accuracy, immediate response time, user language, pronunciation and accent independence, robustness to environment and speaker).

Different systems of ASR are known. FIG. 1 shows a template matching ASR, one of the earliest ASR systems. It uses examples of speech units as the basis for recognition. Each example acts as a template or template sequence 14 for a specific speech unit or test sequence 12 to be recognised. There may be multiple templates 14 for each unit 12 in order to increase the robustness of the system. These units usually are represented in the form of sequences of short-term spectral features such as Mel-frequency Cepstral Coefficients (MFCCs). The Mel-frequency Cepstrum (MFC) is a particular representation of the short-term power spectrum of a sound used in sound processing. It is based on a discrete cosine transform of a log power spectrum mapped onto the Mel scale of frequency.

A comparison between acoustic observations of templates 140, 142, 144 and test sequences 12 is performed by a decoder 10. The acoustic similarity is usually derived from distance measures between the acoustic feature of the template $O^{template}$ and the acoustic feature of the test sequence $O^{test}$. In conventional template matching ASR, a distance metric is used to measure the similarity of acoustic vectors. Suitable distance metrics are normally based on spectral distortion. The distance measure can be for example Euclidian:

$$D_E = \|O^{template} - O^{test}\|$$

or Mahalanobis:

$$D_M = \sqrt{(O^{template} - O^{test})^T S^{-1} (O^{template} - O^{test})}$$

where S represents the covariance matrix of the acoustic vectors.

The underlying assumption of ASR based on template matching is that renditions of sounds are sufficiently similar such that a comparison between acoustic observations of correct templates 14 and test sequences 12 gives a relatively good match compared to computing incorrect templates. In the case of a given user and/or stable recording conditions, since each user normally provides his own templates which contain their own specific pronunciation, the ASR based on template matching is independent from pronunciations and languages.

In the case of a plurality of users and/or different recording conditions, in reality, this is often not the case due to possible variations in pronunciation for the same word. These variations can be produced by inter-speaker pronunciation differences and/or mismatches between recording conditions.

The advantage of the template matching ASR is its simplicity to implement. Moreover it does not require specification of a pronunciation dictionary, since this is implicit in the template 14. Disadvantages include the aforementioned sensitivity to differences in recordings of templates/test utterances in the case of a plurality of users and/or different recording conditions. Moreover the recognition algorithm can be computationally expensive when a large number of templates is used.

Decoding in the template matching ASR is often carried out by using a Dynamic Time Warping (DTW) decoder 10. It implements a dynamic programming algorithm that conducts a search over the test sequence, where all possible template sequences are considered. Some temporal deformation of templates is permitted during this search, hence the "time warping" aspect of this algorithm. The recognised template q is $$q^* = \underset{q}{\mathrm{argmin}} DTW(O^{template(q)}, O^{text})$$

where $DTW(\cdot,\cdot)$ is the dynamic time warping distance between two sequences, the template sequence 14 $O^{template(q)}$ from the template library and the test sequence 12 $O^{test}$.

An example of the DTW search procedure is illustrated in FIG. 2, where a local score 16 is computed at each node of the graph between a test sequence 12 and the corresponding template 14. The DTW score 16 is an accumulation of the local scores traversed in the graph, where the traversed path 20 minimises the total accumulated score; it thus corresponds to a distance between the spoken word and the reference template.

In FIG. 1 for example the spoken word corresponds to the template 142 because this template has the minimum score (score=20) compared to other templates 140 (score=40) and 144 (score=30).

It is simple to extend template ASR to continuous speech recognition by concatenating templates together during dynamic programming.

Template-based ASR systems normally comprise the following components:

- Audio processing front-end: converts audio inputs to acoustic features (the test sequences 12) used in the recognition system.
- Template library: contains all the template sequences 14 that can be recognised by the system.
- DTW based decoding software: matches test sequences 12 to template sequences 14 from the template library.
- Grammar (optional): describes the allowable template sequences 14 that may be recognised (the syntax).

Template based ASR has been largely replaced by statistical speech recognition techniques in ASR systems. Such systems provide better robustness to unwanted variations of the environment and the speaker and scale better to large vocabulary requirements. By contrast, such systems require greater resources for the training of models, are language-dependent and have a lack of robustness when dealing with particular accents.

Such systems are typically based on the HMM (Hidden Markov Model). An HMM is a Markov process, i.e. for an n-th order Markov process, the likelihood of a given future state, at any given moment, depends only on the n previous states, and wherein states are not directly observable. Each state generates an event, i.e. an acoustic observation vector, with a particular state emission probability density function depending only on the state. The acoustic observation vector is observable, the state not.

The finite set of states in an HMM/ASR models acoustic units by which an uttered word is constituted. Typically, the fundamental acoustic unit is the phoneme; some systems use triphones, or other units.

Even if "phone" and "phoneme" are often used interchangeably, they have a little different exact meaning. Phonetics refers to the study of speech sounds, in particular the sounds patterns that characterise the underlying phonological structure of speech. Hence, the phonetic information in an utterance refers to the fundamental speech units that comprise the utterance, phones, where the phones are acoustic realisations of the functional units in language known as phonemes. The distinction between phonemes and phones lies in the fact that the former is a linguistic construct and the latter an acoustic construct. Phones are often referred to as the segmental features of speech.

A phonemes set can be defined for a specific language (eg. Advanced Research Project Agency phonetic alphaBET—ARPABET) or for all languages (e.g. International Phonetic Alphabet—IPA). With respect to ASR, the choice of phone set is somewhat arbitrary (i.e. there are several commonly used phone sets for American English), but must be used consistently in defining the pronunciation relationship between phonemes and words.

Acoustic observation vectors are typically the same as acoustic features used in template based ASR.

Speech recognition is usually carried out by using Viterbi decoding. The most likely sequence Q* is output by the recogniser according to the following relation:

$$Q^* = \underset{Q}{\mathrm{argmin}} p(O^T, Q)$$

$$= \underset{Q=q_1,\ldots,q_T}{\mathrm{argmax}} \prod_{t=1}^{T} p(q_t|q_{t-1}) p(o_t|q_t)$$

where $O^T=[o_1, \ldots, o_T]$ represents the acoustic observation vector, $Q=q_1, \ldots, q_T$ represents the sequence of states $q_1, \ldots, q$ for a recognition hypothesis, $p(o_1|q_1)$ is the likelihood generated by the state emission probability density function for the state $q_t$ and $p(q_t|q_{t-1})$ is the transition probability between hidden states $q_t$ and $q_{t-1}$.

Likelihood $p(o_t|q_t)$ may be generated by any number of statistical models. Most commonly a Gaussian Mixture Model (GMM) is used. In hybrid HMM/MLP systems, a Multi Layer Perceptron (MLP) is used for generating the state emission likelihoods, using the so-called "scaled-likelihood". A Perceptron is a type of artificial neural network constituted by a binary classifier. A MLP is a particular type of artificial neural network that uses more layers of neurons.

In hybrid HMM/MLP systems, the MLP is trained to estimate the posterior probability $p(q_t|o_t)$ of phone classes. An MLP is trained in a discriminative fashion to recognize different classes relevant to a particular task (e.g. speech/non-speech, object recognition, etc.). In speech recognition the classes are specified as the phone/phoneme set which spans the training data/test data (usually, though not always, for a specific language). This posterior probability $p(q_t|o_t)$ is related to the likelihood $p(o_t|q_t)$ generated by the state emission probability density function for the state $q_t$ according to the Bayes relation:

$$p(o_t|q_t) = \frac{p(q_t|o_t) p(o_t)}{p(q_t)} \approx \frac{p(q_t|o_t)}{p(q_t)}$$

where $p(q_t|o_t)$ is the posterior probability estimated by the MLP and $p(q_t)$ is the class prior probability from the training data. $p(o_t)$ can be omitted from the state emission likelihood computation as it is common to all classes.

An extension of the hybrid HMM/MLP approach replaces the direct relationship between HMM states and MLP outputs by a multinomial distribution at each of the HMM states. This so-called KL-HMM is described for example by Guillermo Aradilla, Jithendra Vepa and Hervé Bourlard, "An Acoustic Model Based on Kullback-Leibler Divergence for Posterior Features", in IEEE Int. Conf. on Acoustics, Speech, and Signal Processing (ICASSP), 2007.

The KL-HMM minimises the Kullback-Leibler divergence, or KL-divergence, between training feature vectors and HMM multinomial states generating acoustic observation vectors. For probability distributions P and Q of a discrete random variable, the KL-divergence of Q from P is defined to be $$D_{KL} = \sum_i P(i) \log \frac{P(i)}{Q(i)}$$

HMM-based ASR systems normally comprise the following components:
  HMM-models: describe the relationship between acoustic units (normally phones) and acoustic features.
  Pronunciation dictionary: maps sequences of acoustic units to words.
  Grammar (optional): describes the syntax of the system.

As opposed to template systems, statistical based approaches can incorporate probabilities into the dictionary and grammar in a consistent manner.

A new system and a new method for entering and recognizing a user voice command which are more robust to environment and speaker and simpler to implement than prior art systems are needed.

A new system and a new method wherein the training of models is less time consuming for users are also needed.

A new system and a new method which are able to work with multiple languages, pronunciations and accents are also needed.

A new system and a new method that exploit the feedback of the user are also needed.

BRIEF SUMMARY OF THE INVENTION

According to an aspect of the invention, these aims are achieved by means of an automatic speech recognition system for recognizing a user voice command in noisy environment, comprising
  matching means for matching elements retrieved from speech units forming said command with templates in a template library;
  processing means including a MultiLayer Perceptron for computing posterior templates ($P(O^{template(q)})$) stored as said templates in said template library;
  means for retrieving posterior vectors ($p(O^{test(q)})$) from said speech units, said posterior vectors being used as said elements.

A posterior vector is a vector of posterior probabilities produced by the MLP. One posterior vector is produced for each acoustic feature vector that is generated (e.g. MFCCs). In one embodiment an acoustic feature vector is generated every 10 ms. Posterior probabilities correspond to phone classes. In the case of the English language, in one embodiment there are 42 phones: in this case the posterior vector would have dimensionality 42; the sum of posterior probabilities in the vector would be 1.0; each probability would have to be >=0 and <=1.

A posterior template is a collection of posterior vectors that describe a single instance (or template) of a term to be recognized by the system. For example, if one recorded the posterior template for the noun "one" that had a duration of 0.25 s (=250 ms=25*10 ms), then the posterior template would comprise 25 posterior vectors (each of dimension 42 from the previous example), so that the posterior template would have dimension 25*42.

A posterior vector and a posterior template are considered as features to be input to the template-based classifier (eg. in the place of MFCC). Features are a representation of the original signal (in this case speech) that aim to extract only salient information for the given task. In the case of speech recognition, one is only interested in what has been said not who said it, so that "feature extraction" aims to emphasize the part of the signal pertaining to what has been said while de-emphasizing other aspects. Posterior vectors, in theory, are the perfect feature since they contain exactly the wanted information (posterior probabilities of phone classes) while containing no other information. Unfortunately, the posterior probabilities estimated by the MLP are not perfect thus necessitating further analysis to obtain good performance (e.g. the described use of posterior templates).

The means for retrieving posterior vectors from speech units can include MLP but other statistical estimator can be used to get these posterior vectors.

According to another aspect of the invention, these aims are achieved by means of an automatic speech recognition method for recognizing a command spoken by a user in a noisy environment, said method comprising:
  matching elements retrieved from speech units forming said command with templates in a template library;
  determining a sequence of templates that minimizes the distance between said elements and said templates;
  wherein said templates are posterior templates ($P(O^{template(q)})$);
  and in that said elements retrieved from speech units are posterior vectors ($P(O^{test(q)})$).

According to another aspect of the invention, these aims are achieved by means of an automatic speech recognition system for recognizing a command spoken by a user in a noisy environment, said system comprising:
  means for acquiring training templates during an enrolling session;
  means for audio acquisition of said voice command;
  means for processing said voice command, including at least one MultiLayer Perceptron (MLP);
  a voice activity detector;
  a DTW decoder;
  a posterior template library containing posterior templates
  a dictionary; and
  a grammar.

This method is thus based on a new ASR (Automatic Speech Recognition), which combines aspects of conventional template matching ASR with those of hybrid HMM/MLP ASR. Independence to pronunciation and language is given by the template matching ASR (since each user normally provides his/her own templates which contains his/her own specific pronunciation) and robustness to environment and speaker is granted by the use of the MLP of the hybrid HMM/MLP ASR. Combining these two systems it is possible to have benefits of both. Even though the MLP is normally trained to be language specific, it can still work well for other languages other than that for which the MLP was trained.

Posterior vectors generated by an MLP are incorporated as the basis for posterior templates, where the inputs to the MLP are conventional acoustic feature vectors. As a result, the posterior template recognition is:

$$q^* = \underset{q}{\arg\min} DTW(p(O^{template(q)}), p(O^{text}))$$

The advantages offered by this system are increased robustness to unwanted variability coupled with improved sensitivity to desired aspects of speech. More specifically, the training of the MLP is focused on an increased discrimination between phone classes and ignores other aspects of the acoustic signal. These aspects are subsequently retrieved by the template matching algorithm.

The acoustic templates of the conventional template matching ASR are replaced in this system by posterior templates. Moreover, the local distance measure is modified in order to be more appropriate for posterior features. This system comprises, in addition to normal template-based ASR system, a trained multilayer perceptron (MLP) for the calculation of posterior features. The DTW algorithm, the template library and all the other aspects remain the same as conventional template-based ASR system.

Advantageously, the MLP would be trained for recognizing phonemes in a specific language, for example it can be trained for recognizing 50 English phonemes, or between 30 and 200 English phonemes. In one embodiment it is possible to train multiple MLPs for different languages, for example an MLP for recognizing French phonemes and an MLP for recognizing English phonemes. In one embodiment, a single multilingual MLP can be trained for recognizing phonemes in several languages.

Advantageously, the invention allows a rapid enrollment of the user. In fact, according to the invention, it is possible to select the posterior templates from training templates acquired during the enrolment session of the user, in order to accelerate the operation of the system, because only the most useful templates are selected for the recognition.

In order to measure the similarity between posterior vectors, the system uses metrics based on information theory or probabilistic measures, for example the Kullback-Leibler divergence.

In one embodiment the posterior template library is a pre-existing template library that has been recorded by another user.

In another embodiment the posterior template library is created advantageously from a pronunciation dictionary.

Moreover, online learning strategies, according to the invention, improve the performance of the system by using data collected during the normal activity of the system. By means of this online learning it is possible, for example, to add new posterior templates by extracting them directly from the utterance, i.e. from the complete unit of speech in spoken language, and also to avoid the use of an inappropriate posterior template, i.e. a redundant or erroneously extracted template. It is also possible to assign priorities to the posterior templates.

According to the invention, the posterior template library can be automatically managed. In one embodiment, the feedback of the user can be used.

Advantageously, the noise of the environment can be sensed along directions different from the user's voice direction and exploited in order to improve the signal to noise ratio by using a modified Degenerate Unmixing Estimation Technique (DUET).

In one embodiment, the system comprises also a grammar. In one embodiment, this grammar comprises a static network of nodes defining words in the lexicon and edges defining allowable transitions between words.

According to one aspect of the invention, the DTW decoder includes parameters for modifying the computing accuracy and/or speed.

According to a further aspect, the invention also concerns an automatic speech recognition method for recognizing a command spoken by a user in a noisy environment, said method comprising:
  acquiring training templates during an enrolling session;
  audio acquisition of said voice command;
  processing said voice command, with at least one Multi-Layer Perceptron;
  voice activity detection;
  DTW decoding with a DTW decoder, a posterior template library containing posterior templates and a dictionary.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The invention is based on a new ASR (Automatic Speech Recognition system), which combines aspects of conventional template ASR and hybrid HMM/MLP ASR. Posterior vectors generated by an MLP (Multi Layer Perceptron) are incorporated as the basis for posterior templates. The inputs to the MLP are conventional acoustic feature vectors.

This system has increased robustness to unwanted pronunciation, language, accent and environment variability compared to the template ASR system. Moreover the sensitivity or the accuracy is improved.

As mentioned, independence to pronunciation and language is given by the conventional template based approach (since each user normally provides his/her own templates, which contain their own specific pronunciation) and robustness to environment and speaker is granted by the use of the MLP (similarly to conventional ASR system). Combining these two systems, the new system gets the benefits of both. Even though the MLP is normally trained to be language specific (though not necessarily so) it can still work well for other languages than that for which the MLP was trained.

The new system enables the development of a limited and controlled vocabulary continuous speech recognition system that is robust to environments with highly demanding conditions such as noisy environments. The system is also robust to speaker variability thanks to the properties of the MLP.

Figure 6:
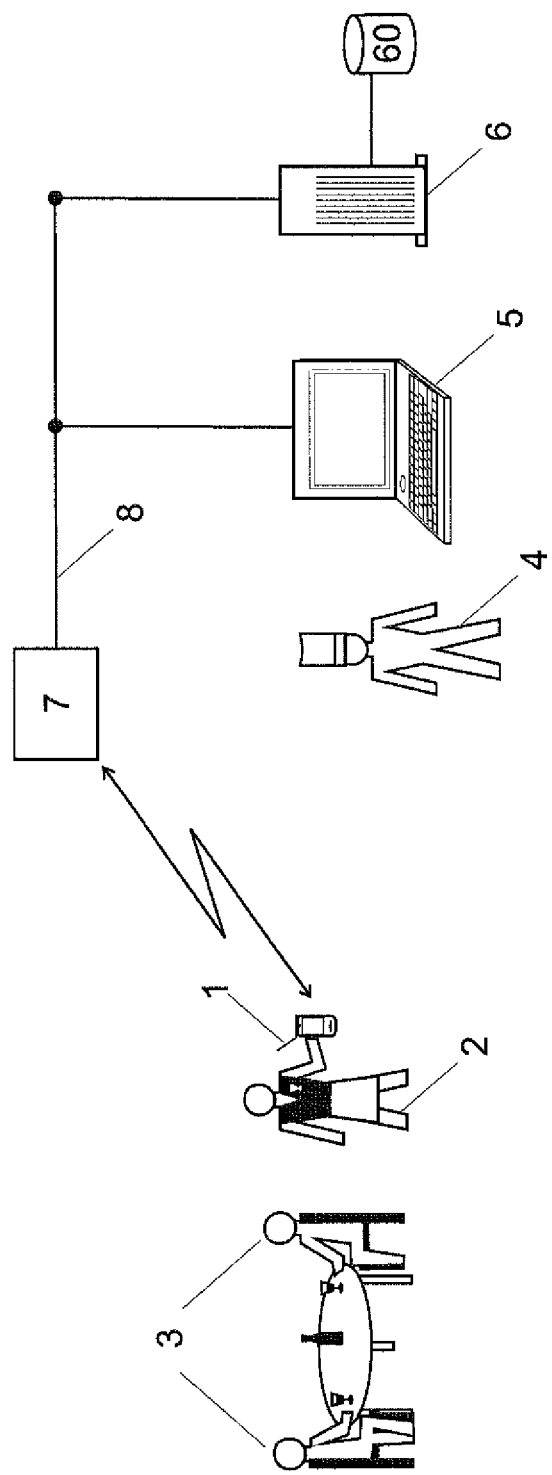
FIG. 6 schematically shows a system for capturing and transmitting voice orders in a restaurant.

An example of environment in which the method and system can be used is illustrated in FIG. 6. In this setting, a waiter 2 in a bar or restaurant takes orders from customers 3 sitting at a table. The waiter repeats each order and speaks them in a microphone of a mobile device 1. In this embodiment, the recorded voice signal is locally processed, for example by the processor of the mobile device 1 or preferably by dedicated processing means, in order to improve the signal-to-noise ratio. This processing could also be done by a remote computer or server in another embodiment, although this likely can introduce a delay. The processed voice signal is then wirelessly transmitted over the air to an access point 7, by using a standard wireless communication protocol such as 802.11, Bluetooth, etc. In another embodiment, not shown, the voice signal is transmitted by using wires. The access point 7 belongs to a local area network 8 (LAN), to which various other equipments such as a personal computer 5, a server 6 with a database 60 for storing a template library, etc are connected. The voice signal received from the access point 7 is converted into text orders by the server 6 which runs a speech recognition algorithm and a bar or restaurant management software. The text orders are then displayed and processed for delivering and billing the requested order to the customers 3.

In another embodiment the microphone for recording voice signals is not connected to a mobile device 1 but directly to a personal computer 5: in such a case the voice signal is not wirelessly transmitted.

The speech recognition algorithm could be executed by the mobile device 1 if this device has enough processing power; this may however make an update of the speech and language models (such as the list of commands to recognize, and associated grammar) more difficult. This requires however devices 1 with more processing power, and a more difficult synchronisation of the speaker dependant models if one user uses several different devices.

The system according to the invention is composed of several logical components which can be integrated into the device 1, for example as software and/or hardware components, and/or as an extension of the device, such as an extension with a DSP processor, and/or as a software application executed by the server 6.

Server side operations are carried out by using a particular ASR front-end for doing speech signal processing for a DTW decoder.

An example of method according to the invention will now be described with FIG. 3. The step 30 in the Figure represents the audio acquisition: voice commands spoken by the waiter 2 are sensed by a microphone of the device 1, for example a microphone array, and preferably processed using beamforming technology. This audio acquisition is preferably conducted with a DSP expansion of the device 1.

The step 32 represents the acoustic feature extraction and calculation: standard Mel-frequency cepstral coefficients (MFCCs) are extracted from the voice signal. These coefficients are then normalised for mean and variance. This extraction and calculation may be carried out either in the DSP 1 and/or at the server side 6. During this step, energy computation of the voice signal is also carried out in the DSP 1 and/or at the server side 6.

Voice activity detection (VAD) can be carried out at server side 6, possibly in two phases. The first phase 34 is carried out by using the energy computations of step 32. This first phase 34 is critical in the computation of mean and variance estimates.

Post-processing of features, for example mean and variance normalisation, is carried out at the server side 6 in step 36.

In one embodiment, the post-processing performed at step 36 comprises also calculations for improving the signal to noise ratio. In one embodiment, voice commands can be sensed by multiple arrays of microphones. For example four perpendicular arrays of microphones can be used, in order to capture sounds coming from four main directions: front (the voice direction), back, left and right. In this manner background noise from different directions is sensed. This aspect is especially important for example in a restaurant context, where a waiter can take orders from customers sitting at a table while customers sitting at a near table are talking. The post-processing step 36 depends on the spatial disposition of multiple arrays of microphones and implies a comparison, in the frequency domain, of the four signals delivered by the microphone array (front, back, left, right) by using adaptive filters based on a modified DUET (Degenerate Unmixing Estimation Technique). For each of the four channels, these adaptive filters allow decreasing the influence of the noise in the front channel, by spectral subtraction of the signals of the three other channels that are basically sensing noise.

The step 38 represents the estimation of the MLP (Multi Layer Perceptron), which outputs posterior vectors based on the input processed acoustic features. One posterior vector is output for each input acoustic feature vector. The MLP training and posterior estimation is carried out using a machine learning library, written for example in C++ or C#. The MLP posterior estimation is integrated into the ASR front-end at the server side 6.

The second VAD phase 42 is carried out preferably at server side 6 after MLP estimation and simply thresholds the probability of silence as computed in the MLP. This second phase is critical because the silence is not normally explicitly modelled in the templates in an ASR system.

The voice detection is preferably done by analysis of the power signal. When there is no voice, the residual signal is cancelled in order to remove all noise between periods of speech. In one embodiment, the function of the voice activity detector can also be performed or assisted for example by a push-button (physical or touch-screen) of the device 1, similar to the push-button of a walky-talky device, or by another mean (activation of a signal with a waiter's foot or eye, the position of the mobile device, etc.). This button or in general this means is selected by the user 2 in order to activate the device 1. If the user does not select this means, even if he speaks into the device 1, his voice is not captured. In one embodiment, the microphone is always recording, allowing then to configure the system to select exactly the portion of recording to be sent for processing. It is then possible for example to select the possibility to send the voice command for example 1A second before the means is selected and for example 1A second after this means is released or selected again. This way, in case the user 2 pushes or releases the means a bit too early or too late, the portion of recording of interest can be kept without losses. The push-button or in general the means can also be used to select the grammar to be used by the ASR (and thus to reduce the number of words to recognize in a given context) in order to increase the accuracy and reduce the response time of the ASR.

Step 44 represents the retrieval of posterior templates from the posterior template library. Each element in the posterior template library comprises a sequence of posterior vectors and an associated template index or term. For generating the posterior template library, recordings of vocabulary words/ phrases are taken during an enrolment session and then passed through the steps 30-42 in order to compute the posterior templates. The posterior template library is preferably stored in a central server 6 for common use and management from a plurality of devices 1 and users 2.

The dashed arrow between steps 42 and 44 indicates that this connection is performed during the generation of this posterior template library.

Step 40 represents the dynamic time warping (DTW) continuous speech recognition decoding. It is preferably carried out at server side 6. The decoder takes as input the sequence of posterior vectors to be recognised and processed by the ASR front-end during steps 30-42, the posterior template library 44, a dictionary 46 and an optional grammar 48.

The decoder outputs the sequence(s) of recognised words, a time information (start/end) and confidence measures. The decoder includes in one embodiment various parameters for tuning accuracy versus speed.

The dictionary 46 defines the relationship between posterior templates (actual recordings of words/phrases) and the nodes in the grammar. It is necessary to disambiguate between multiple uses of templates in the grammar.

Optionally, a grammar 48 can be employed by the decoder. In one embodiment the system uses a static network of nodes defining words in the lexicon and edges defining allowable transitions between words.

Figure 1:
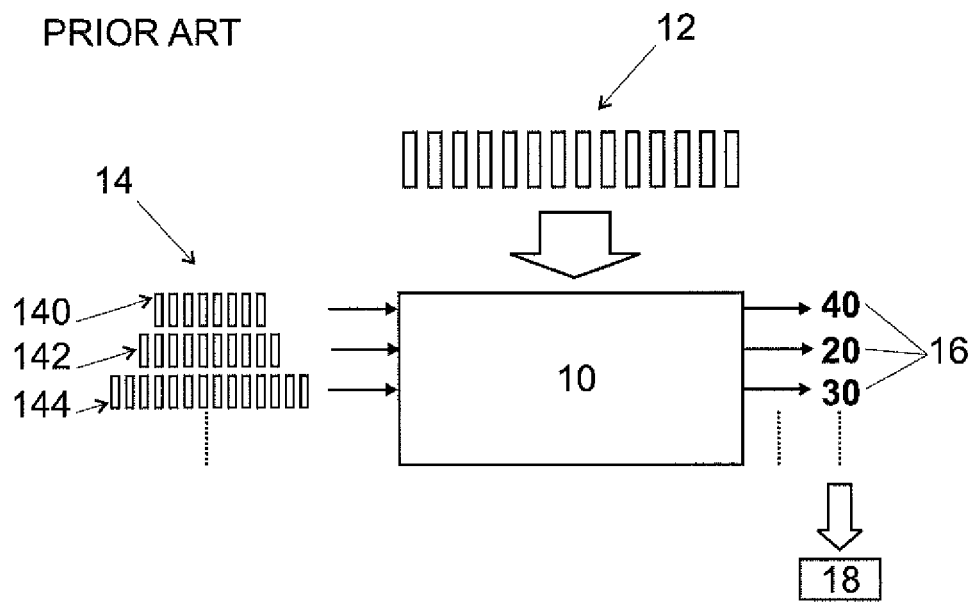
FIG. 1 shows a view of a template ASR system.
Figure 2:
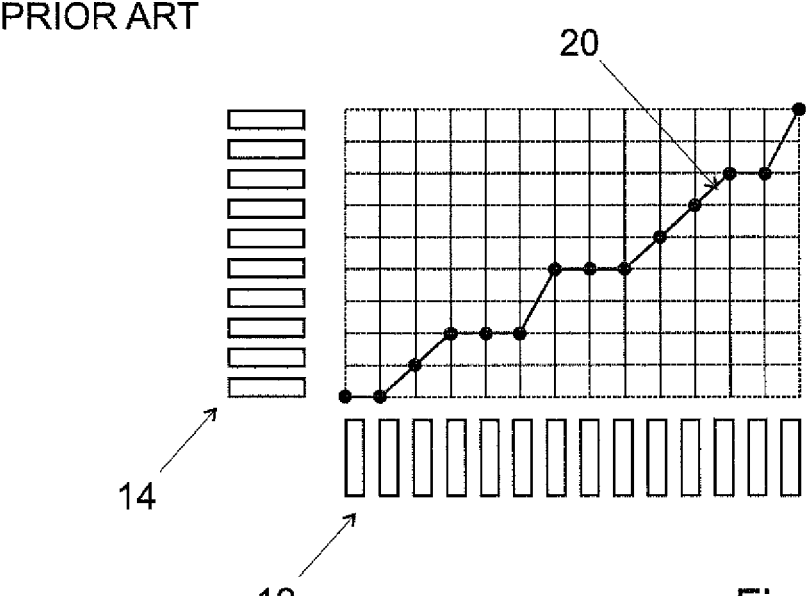
FIG. 2 shows an example of the DTW search procedure in a template ASR system.
Figure 3:
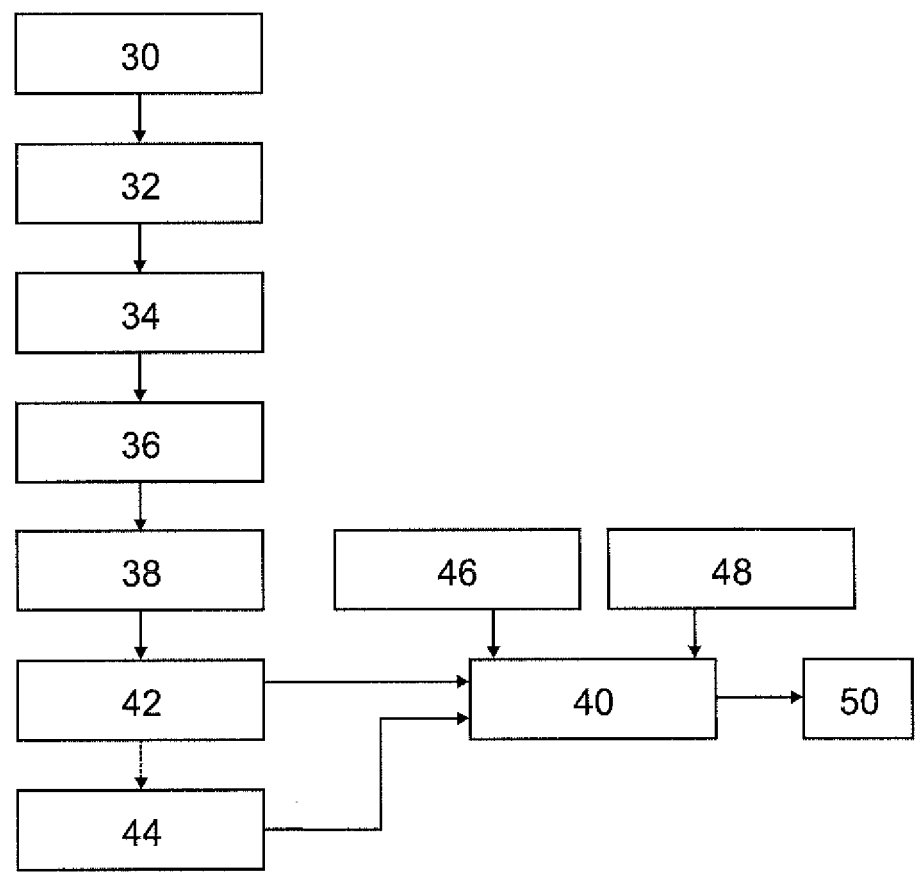
FIG. 3 is a flow diagram of the system according to the invention.

The system illustrated in FIG. 3 is capable of recognizing commands from a user using a posterior template library recorded during an enrolment session. Training of the posterior template library is initially carried out during an enrolment session in which the user is required to speak the desired words, for example the words contained in the menu of the day, at least once. In order to improve the robustness of the system and take into account different pronunciations or different recording conditions, the user speaks the desired words more than once. Further training and speaker-dependant adaptation of the posterior templates can be performed during normal use of the system, using for example feedbacks and correction of input by users 2 with haptic means on their device when a speech unit or a word has been wrongly recognised.

When the list of command terms becomes large, the enrolment session can become time consuming for the user, particularly if multiple templates are recorded per term. Moreover it results in slower operation of the system because more templates have to be considered during decoding. Therefore, according to another aspect of the invention, a mechanism to simplify the enrolment process is provided.

According to an aspect of the invention, it is possible to select from a set of templates provided by the user the most useful for recognition. This enables the use of a minimum number of templates, improving response time. It is also possible to determine if the template library provides sufficient variability of user's possible inputs, maximising performances with respect to time spent during the enrolling session. For this purpose condensed/edited nearest neighbour approaches are used, in order to maximally reduce the number of training examples without sacrificing the performance of the system.

The simplest condensed nearest neighbour approach (Hart's rule) simply finds the subset of data m that minimises error on the remaining data n−m. A disadvantage of this rule is that it requires an arbitrary selection of m, which may result in too many or too few training examples.

For this reason, the invention exploits advantageously graph approaches in order to condense or edit the training set. These approaches aim to construct/approximate the classifier decision boundary and remove training samples that do not contribute to this boundary. Many of these approaches are not suited to high dimensional spaces, and in the case of DTW ASR are unfeasible. According to an aspect of the invention, such graphs are advantageously considered in terms of distance metric, which for DTW is simply:

$$D(\text{template}_q, \text{template}_p) = \text{DTW}(p(O^{\text{template}_q}), p(O^{\text{template}_p}))$$

An approach that can be employed is the Gabriel approach. In this approach one determines which points A and B are neighbours such that no other points X lie in their diametrical sphere:

$$D^2(A,X) + D^2(B,X) > D^2(A,B) \forall X \neq A, B$$

Another possible approach is the relative neighbour graph approach, where the set of relative neighbours A, B must satisfy the following relation:

$$D(A,B) < \max\{D(A,X), D(B,X)\} \forall X \neq A, B$$

The training set can then be condensed or edited following these steps:
  determination of the Gabriel/relative neighbours by calculating a matrix of distances between all training templates;
  visiting each training template;
  marking a training template if all its neighbours are of the same class as the current training template;
  deleting all marked training templates.

The remaining training templates constitute the desired edited training set. During the determination of the neighbours, heuristics can be applied in order to reduce the necessary computation. The use of such editing rules using DTW distance is only an approximation since the geometric relations that determine neighbours rely on the distance measure obeying the triangle inequality. DTW distance does not obey this inequality, but works well in practice.

Optimisation of the posterior template library can be a computationally expensive process since the DTW distance must be calculated twice for each pair of posterior templates in the posterior template library. That is, if there are N posterior templates, this involves $N^2 - N$ DTW distance computations. In order to reduce the computation time it is possible to approximate the DTW distance by a linear interpolation of the posterior templates. That is, if N=2, i.e. there are two posterior templates, for example the $\text{template}_q$ and $\text{template}_p$ respectively of length $L_q$ and $L_p$, a linear interpolation interp( ) can be applied to these two templates such that $$\text{interp}(\text{template}_p, L_q)$$

produces an interpolated version of template, of length $L_q$. Then, the DTW approximate distance becomes:

$$\text{DTW}_{approx}(\text{template}_p, \text{template}_q) = \|\text{template}_p - \text{interp}(\text{template}_p, L_q)\|$$

and the distance used for editing the posterior template library becomes:

$$\|\text{template}_p - \text{interp}(\text{template}_q, L_p)\| + \|\text{interp}(\text{template}_p, L_q) - \text{template}_q\|$$

where $\|\cdot\|$ signifies the L2 norm or Euclidean distance.

In another embodiment, in order to accelerate the user's enrolment, the user can employ a pre-existing template library that has been recorded by another user. The use of the MLP in the system gives to the matching algorithm a degree of robustness so that it is less significantly affected by the variance of speaker's characteristics, particularly those related to voice characteristics.

Given a new user of the system, an already enrolled user that most closely matches the new user can be found. More specifically the new user has to record a limited series of validation utterances and the closest matching posterior template library is found once again by means of the DTW algorithm. If the average DTW distance between the validation utterances and the closest matching posterior template library are low enough, the new user can use this template library and still achieve the desired performance.

In another embodiment a new user is able to enrol into the system without the need to record templates and without the need to use templates of another user. This is possible by using a pronunciation dictionary, which maps sequences of acoustic units in a canonical form to words, in order to construct posterior templates. The constructed posterior templates are named "bootstrap templates".

The acoustic units used to generate the bootstrap templates can be derived from HMM that uses the same metric as the regular templates. For the KL-divergence metric discussed above, this is the KL-HMM in which each state is represented by a multinomial distribution. The multinomial distribution has the same form as the posterior vectors used in the template library and is calculated as the geometric mean of the posterior vectors associated with that phoneme in the training data. This requires the calculation of the multinomial distributions for each phoneme class output of the MLP.

Figure 4:
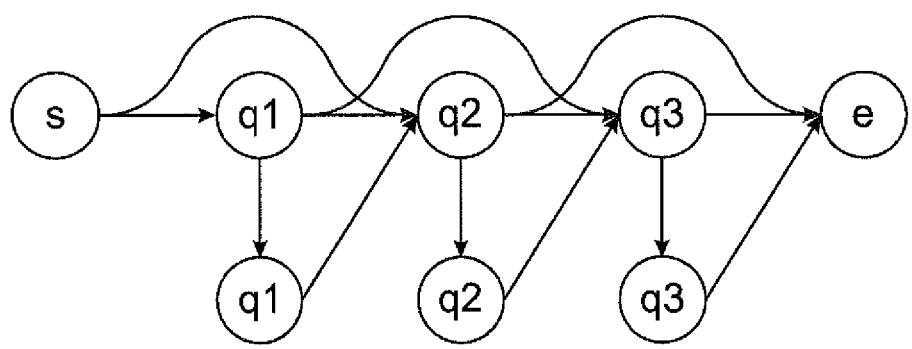
FIG. 4 shows a typical template transition configuration.
Figure 5:
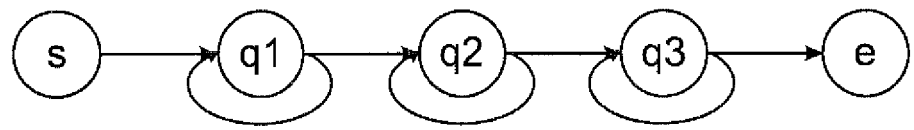
FIG. 5 shows a template transition configuration for bootstrap templates.

Bootstrap templates allow a configuration of the allowed transitions between states of the template which provides more flexible state durations than conventional templates, as shown in FIGS. 4 and 5. FIG. 4 illustrates the allowable transition in a "regular template" in which the template is represented by a finite state machine (FSM) with states $q_1$, $q_2, \ldots, q_n$ representing the N frames from the template. Each state can thus have a duration of zero (i.e. it is skipped), one (no warping) or two (duration stretching). By contrast, the bootstrap template illustrated in FIG. 5 where each state in the FSM corresponds to states in the KL-HMM can have a minimum duration of one and infinite maximum duration (due to the self transition).

When "regular" templates and "bootstrap" templates are used together, in order to address inconsistencies between scores generated by the "regular" and the "bootstrap" templates, a number of additional features are incorporated into the decoder. Firstly, bootstrap templates have a tendency to produce many insertions because they are of short duration (typically three states per phoneme KL-HMM) and also provide a poorer match to the test utterances than regular templates. As compensation, an insertion penalty is introduced into the bootstrap templates and applied at all transitions into bootstrap templates. Normally when calculating the distance at each frame the following equation is used:

$$Q^* = \mathrm{argmin} \sum_{t=1}^{T} D_{KL}(P(o_t), Q(q_t))$$

where $P(o_t)$ is the posterior vector from the test sequence at time t for acoustic observation $o_t$ and $Q(q_t)$ is the posterior vector from the template library and $q_t$ is the corresponding state (frame) in the template library against which the current frame $o_t$ of the test sequence is compared.

Thus, at each new bootstrap template an insertion penalty is inserted:

$$Q^* = \mathrm{argmin} \sum_{t=1}^{T} D_{insert}(q_t) + D_{KL}(P(o_t), Q(q_t))$$

were normally $D_{insert}(q_t)=0$ unless $q_t$ corresponds to the first state (frame) in a bootstrap template, in which case $D_{insert}(q_t)>0$.

By introducing the insertion penalty the problem of insertions is addressed, but this now strongly favours regular templates in the case where template libraries composed of both regular and bootstrap templates are used. To balance it, a scale factor is applied to the bootstrap template scores such that:

$$Q^* = \mathrm{argmin} \sum_{t=1}^{T} D_{insert}(q_t) + D_{scale}(q_t) + D_{KL}(P(o_t), Q(q_t))$$

where for regular templates $D_{scale}(q_t)=0$ and for bootstrap templates $D_{scale}(q_t)<0$. Typical (non-zero) values of $D_{insert}$ and $D_{scale}$ respectively are 25 and −0.85.

Furthermore, the recognition can be made more robust to errors in voice activity detection by using a KL-HMM for silence. In the previously described operation of the system it is assumed that all silence is removed from the recording using voice activity detection so that only samples of speech are being recognised. In reality, VAD can fail to remove all silence. In this case it can be useful to include a 'silence template' that is generated from the silence KL-HMM used to generate bootstrap templates. This silence template can be optionally inserted at the beginning and/or end of all templates that we are attempting to recognise and will absorb any silence frames that have not been removed by the VAD, working as a filter silence.

Online learning is the process whereby the performance of a classifier can be improved by using data collected during its normal operation. This may be done in two manners:
- an unsupervised manner, by using decisions made by the classifier to update the model, or
- a supervised manner, using user's feedback to update the classifier.

Online learning can be considered as a means to update the posterior template library. In one embodiment, online learning can be used to improve system performance, particularly when used in combination with the proposed rapid enrolment techniques described above.

During system usage, feedback is provided by the user. He can check if the recognition was correct, and confirm or correct the command recognised by the server 6 and displayed by the device 1. By using this feedback new templates can be entered into the system.

In an online scenario, it is necessary to manage the activation or addition of new templates to the library. In such cases the criteria of condensing/editing previously described can be applied. The activation or addition of new templates can be performed:
- when the posterior template library does not contain sufficient examples; when for example bootstrap templates or templates from other users are used, it is possible to activate or add to these templates those of the actual user.
- when the voice command is incorrectly recognised. The test utterance may be misrecognised because the noise level is too high or because the posterior template library does not contain a good match to the test utterance. In the latter case a template can be activated or added to the library in order to improve future performance.

when the posterior template library has to be improved, even if the test utterance is correctly recorded. New templates can be activated or added if the test utterance contains potential templates that are sufficiently different from those currently present.

Template matching via DTW provides the recognised templates plus timing information, i.e., the start/end times of each of the recognised templates. In one embodiment the extracted time boundaries can be used in order to extract new templates.

In another embodiment, it is possible to keep track of template usage to determine whether an "inadequate" template has been added to the library. More specifically, a template which records poor recognition accuracy can be removed because it likely contains an erroneous recording or high noise levels. A set of heuristics may be determined to manage such circumstances.

According to the invention, it is possible to manipulate the posterior template library in order to:
 create a new user;
 delete an existing user;
 enroll a user using conventional enrolment or proposed enrolment methods;
 activate/deactivate or add/replace templates using proposed online methods or (re)enrolment sessions;
 delete templates.

In one embodiment the origin of the template (conventional/bootstrap) compared to the speaker (user/other speaker) and also recording conditions (enrolment/online learning) are recorded. In this way, during the update of the library, priorities can be assigned: for example the system can replace with a higher priority the templates generated during a rapid enrolment. Different priority can be assigned also in the basis of recording conditions (enrolment/online learning).

In another embodiment template usage statistics are used for the purpose of debugging and online learning. For each template of the library and optionally for each item of the grammar, statistics based on the number of times where a template or an item has been recognised or misrecognised are maintained.

In one embodiment the library is updated by using automatic or semi-automatic means. The system can keep track of performances and suggest the user to record further templates during an additional enrolment session. Further underutilized templates or templates with poor recognition performance can be automatically deleted from the library.

The system is then able to collect data, for example the enrolment data from various users and data obtained during the normal use of the system.

The method and the system according to the invention can be used for example for taking orders or commands in hotels, restaurants, bars, retail business (groceries, bakeries, butchers, etc), hospitals and laboratory. The method and the system according to the invention can be used for example also for commands in video game consoles, commands of equipment, vehicles, robots, buildings etc. Another possible application of the invention is the stock/inventory management. All these possible applications are not to be construed in a limited sense.

In one embodiment the system according to the invention comprises
 a user device 1 adapted for allowing a user 1 to enter voice commands;
 pre-processing means in the user device 1, adapted for pre-processing the entered voice commands;
 connection means 7, 8, which can be wireless or wired, for transmitting pre-processed signals to a central server 6 that controls equipments, robots, vehicles or buildings;
 a management and control software 5 for managing/controlling equipments, robots, vehicles or buildings according to commands/orders entered by the user 2 through the voice commands.

In another embodiment the method according to the invention further comprises:
 entering voice commands corresponding to bar, restaurant or hotel orders in a user device 1;
 pre-processing the voice commands in a user device 1;
 transmitting 7, 8 the pre-processed signals to a server 6;
 converting the pre-processed signals into text orders in the server 6;
 displaying the text orders;
 communicating the orders to software and/or systems such as, but not limited to, POS (Point-Of-Sale), PMS (Property Management System), Stock/Inventory Management System, ERP (Enterprise Resource Planning) used by the bar, restaurant or hotel.

The method according to the invention can further comprise the following steps:
 entering voice commands in a user device to control equipments, robots, vehicles or buildings 1;
 pre-processing the voice commands in the user device 1;
 transmitting 7, 8 pre-processed signals to a server 6;
 converting the pre-processed signals into text orders in the server 6;
 displaying the text orders;
 communicating the orders to software and/or systems that control the equipments, robots, vehicles or buildings.

The invention claimed is:
1. An automatic speech recognition system for recognizing a user voice command in a noisy environment, comprising:
 matching means for matching elements retrieved from speech units forming the command with templates stored in a template library;
 processing means for determining a sequence of templates that minimizes a distance between the elements and the templates, wherein the templates are posterior templates, the elements retrieved from the speech units are posterior vectors, and the posterior templates and the posterior vectors are generated with a MultiLayer Perceptron;
 calculating means for automatically selecting a subset of the posterior templates, the selection of the subset of the posterior templates including:
  (i) determining Gabriel or relative neighbors of the selected subset of the posterior templates by calculating a matrix of distances between all of the posterior templates,
  (ii) visiting each template of the subset of posterior templates,
  (iii) marking a template of the subset of the posterior templates if all of its neighbours are of a same phone class as the template; and
  (iv) deleting all marked posterior templates, wherein the remaining posterior templates constitute the selected subset of the posterior templates; and
 a dynamic time warping (DTW) decoder for matching the posterior vectors with the selected subset of posterior templates, wherein the DTW decoder receives input, the input comprising a sequence of posterior vectors to be recognized, a posterior template library, a dictionary and optionally a grammar, and the DTW decoder outputs one or more sequences of recognized words, time information and confidence measures.

2. The system of claim 1, further comprising a voice activity detector.

3. The system of claim 1, wherein the MultiLayer Perceptron is multilingual.

4. The system of claim 1, further comprising at least two MultiLayer Perceptrons, wherein each of the MultiLayer Perceptrons is configured for different specific languages.

5. The system of claim 1, wherein the template library is a pre-existing template library generated from training templates spoken by another user.

6. The system of claim 1, further comprising means for creating the template library from a pronunciation dictionary.

7. The system of claim 6, wherein the matching of the DTW decoder is based on a Kullback-Leibler (KL)-divergence metric.

8. The system of claim 1, further comprising means for automatically adapting the template library by activating, deactivating, adding, deleting or substituting the posterior templates.

9. The system of claim 8, wherein the means for automatically adapting uses a feedback of user input on a user device.

10. The system of claim 1, wherein the input of the DTW decoder comprises the grammar.

11. The system of claim 1, further comprising voice activity detector means that can be selected and de-selected by the user.

12. The system of claim 11, wherein the grammar is selected by the voice activity detector means.

13. The system of claim 1, wherein the DTW decoder incorporates an insertion penalty, a scale factor and a filter silence.

14. The system of claim 9, wherein
the user device is configured to allow a user to enter the voice commands, and
the system further comprises:
pre-processing means in the user device, adapted for pre-processing the entered voice commands;
connection means for transmitting pre-processed signals, based on the pre-processed voice commands, to a central server in a bar, restaurant or hotel; and
restaurant, bar or hotel management software for managing bar, restaurant or hotel orders entered by the user through the voice commands.

15. An automatic speech recognition method of recognizing a voice command spoken by a user in a noisy environment, the method comprising:

matching elements, by matching means, retrieved from speech units forming the command with templates stored in a template library;

determining, by processing means, a sequence of templates that minimizes a distance between the elements and the templates, wherein the templates are posterior templates and the elements retrieved from the speech units are posterior vectors, the posterior templates and the posterior vectors being generated with at least one MultiLayer Perceptron;

selecting a subset of the posterior templates, the selection of the subset of the posterior templates including:
(i) determining Gabriel or relative neighbours of the selected subset of posterior templates by calculating a matrix of distances between all of the posterior templates,
(ii) visiting each template of the subset of posterior templates,
(iii) marking a template of the subset of posterior templates if all of its neighbours are of a same phone class as the template, and
(iv) deleting all marked posterior templates, wherein the remaining posterior templates constitute the selected subset of the posterior templates; and using a dynamic time warping (DTW) decoder configured to match the posterior vectors with the selected subset of posterior templates, wherein
the DTW decoder receives input, the input comprising a sequence of posterior vectors to be recognized, a posterior template library, a dictionary and optionally a grammar, and
the DTW decoder outputs one or more sequences of recognized words, time information and confidence measures.

16. The method of claim 15, further comprising:
entering the voice commands corresponding to bar, restaurant or hotel orders in a user device;
pre-processing the voice commands in a user device;
transmitting pre-processed signals, based on the pre-processed voice commands, to a server;
converting the pre-processed signals into text orders in the server;
displaying the text orders; and
communicating the orders to software and/or systems used by a bar, restaurant or hotel.

17. The method of claim 15, further comprising:
recording continuously the voice command by means of an audio acquisitioning system,
selecting a voice activity detector means,
de-selecting the voice activity detector means, and
processing the voice command at a time before selecting the voice activity detector means and at a time after de-selecting the voice activity detector means.

* * * * *